No. 775,436. Patented November 22, 1904.

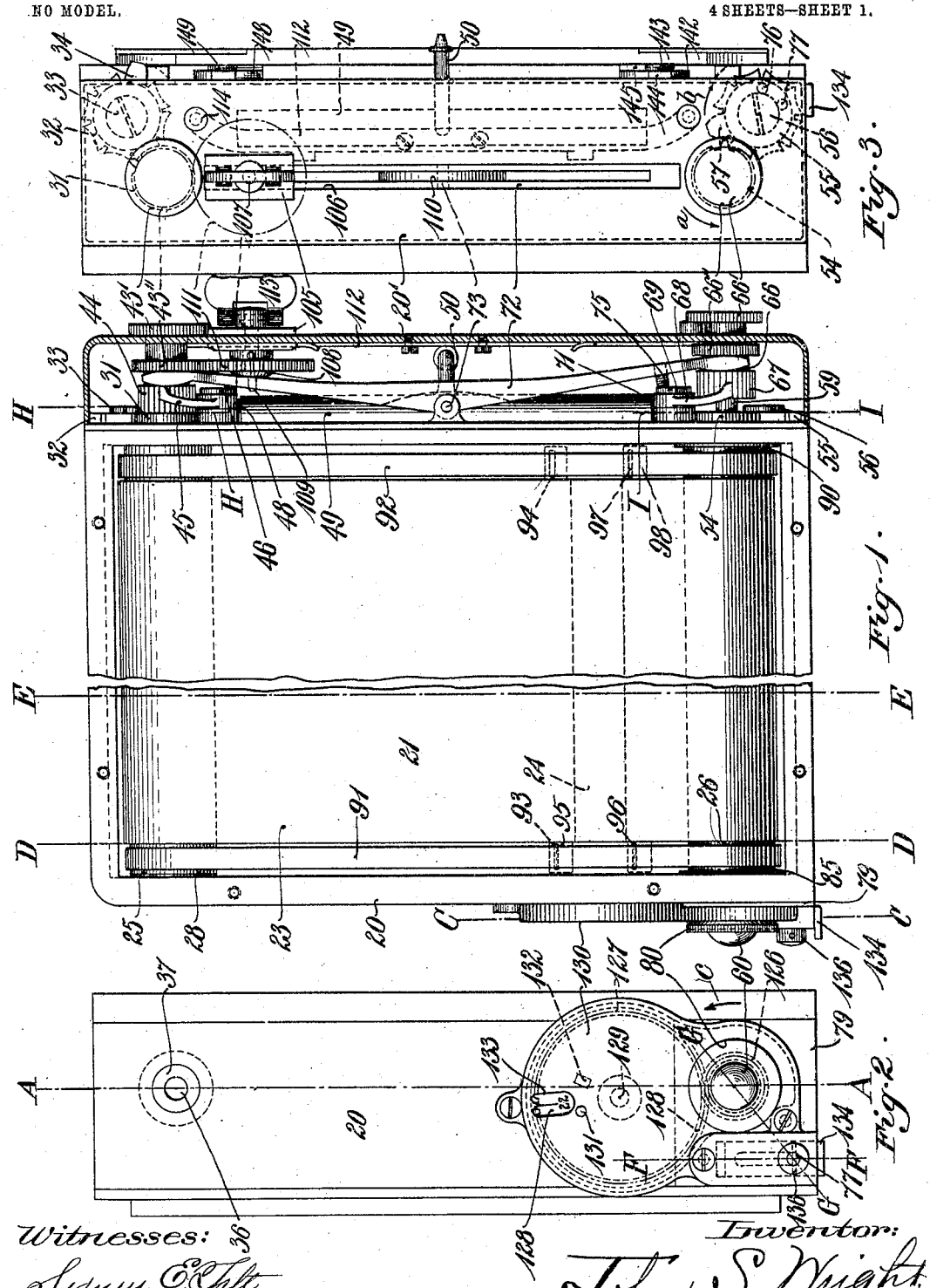

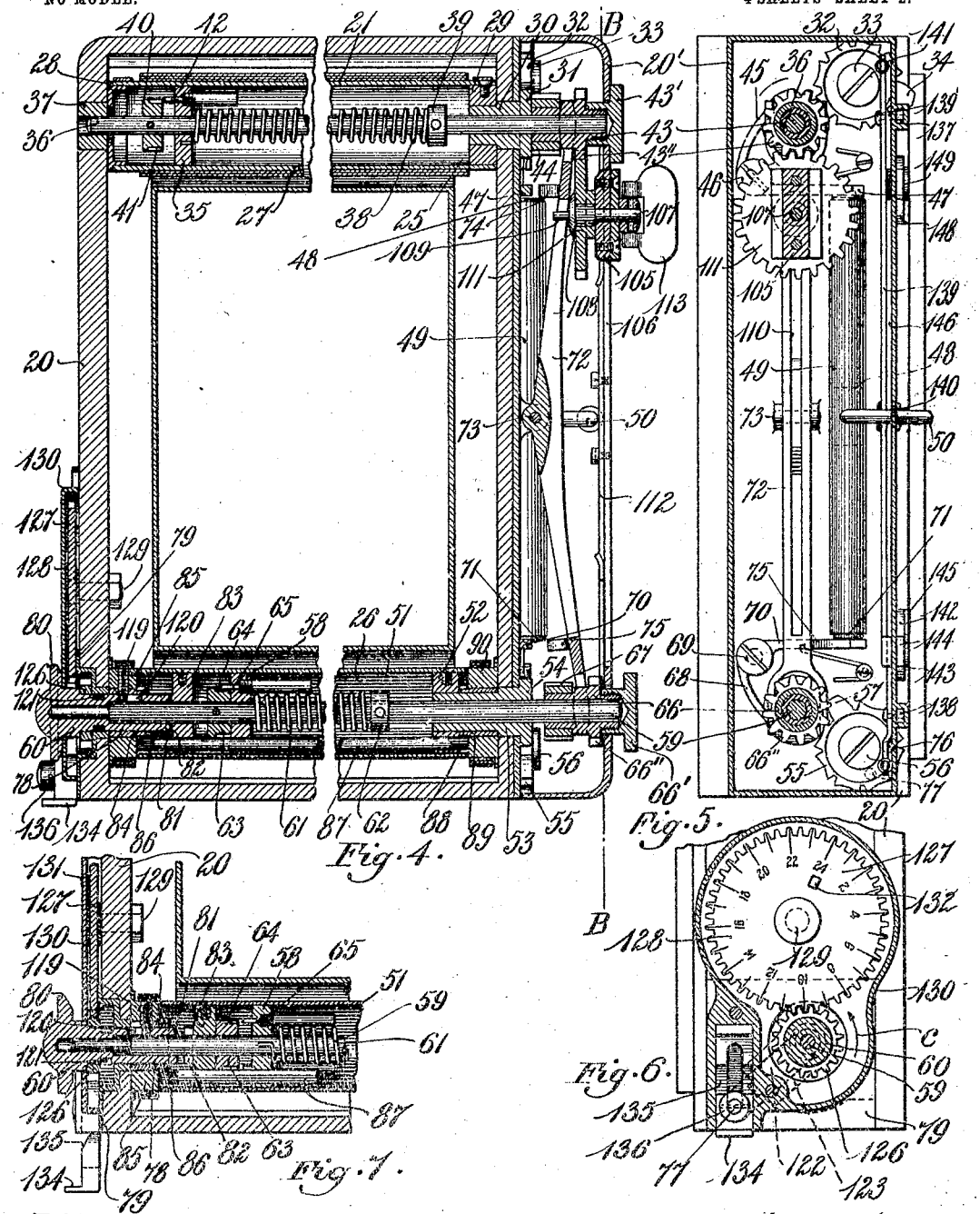

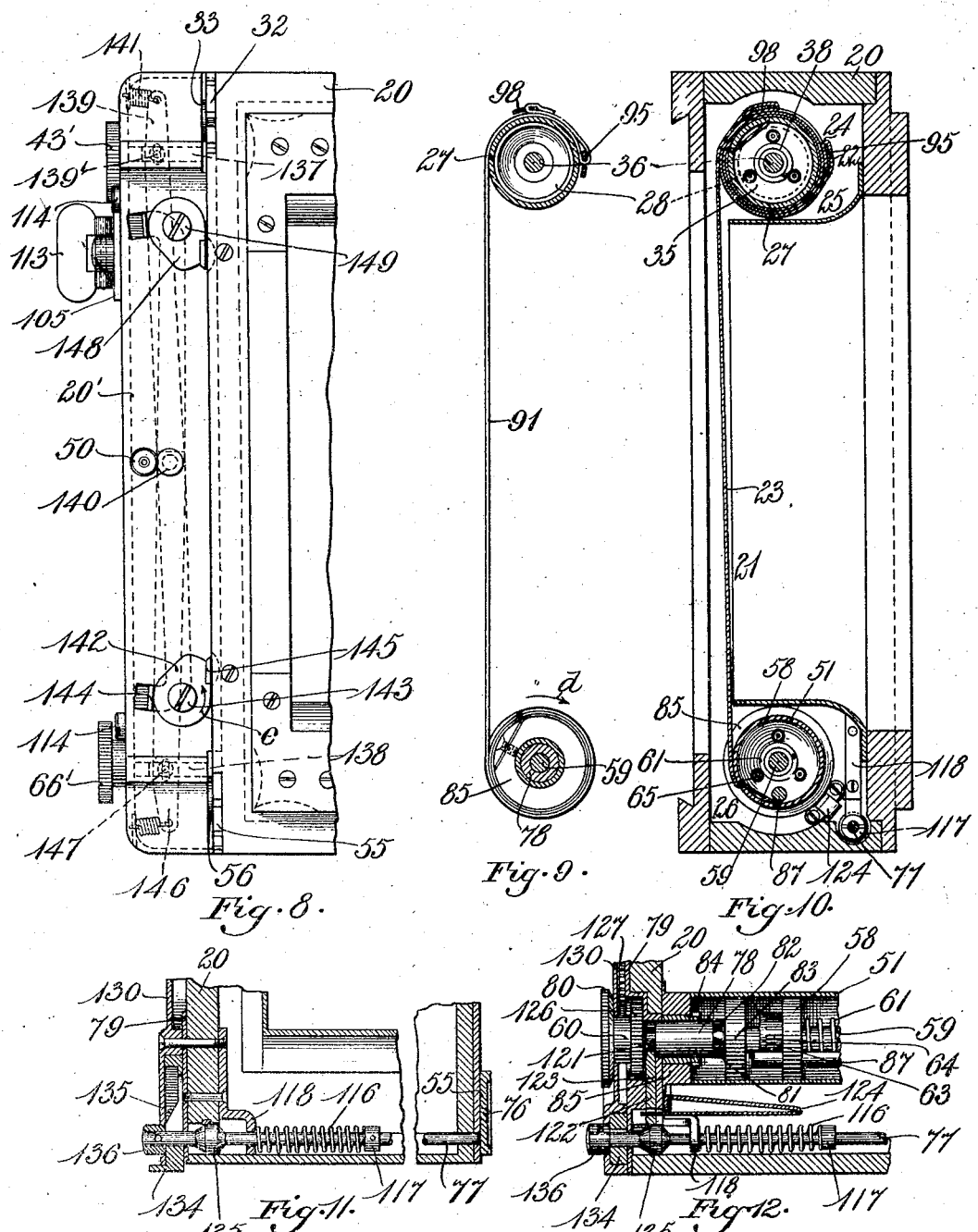

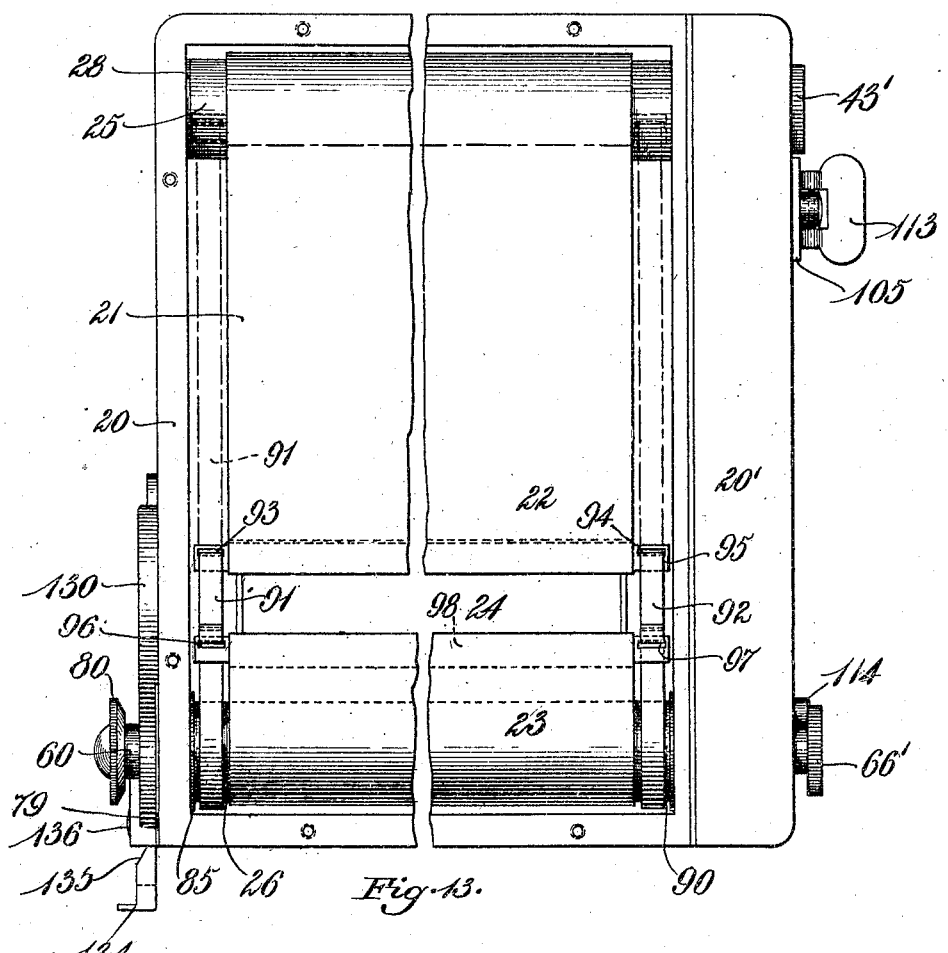

UNITED STATES PATENT OFFICE.

JOHN S. WRIGHT, OF DUXBURY, MASSACHUSETTS.

PHOTOGRAPHIC SHUTTER.

SPECIFICATION forming part of Letters Patent No. 775,436, dated November 22, 1904.

Application filed December 14, 1903. Serial No. 185,066. (No model.)

*To all whom it may concern:*

Be it known that I, JOHN S. WRIGHT, a citizen of the United States, residing at Duxbury, in the county of Plymouth and State of Massachusetts, have invented new and useful Improvements in Photographic Shutters, of which the following is a specification.

This invention relates to photographic shutters for cameras, and is an improvement upon the photographic shutter for which Letters Patent of the United States were granted to me April 28, 1903, No. 726,608. Like the photographic shutter illustrated and described in said Letters Patent, the device of this invention may be located either in front of the lens, between the glasses of a double lens, at the rear of the lens, or in the focal plane of the lens of the camera. In the present case I have illustrated my invention as adapted to be placed at the rear of the lens of the camera and in the focal plane of the lens of the camera.

The object of the invention is to provide a photographic shutter for cameras which may be used for instantaneous or time exposures and which may be used to take an instantaneous picture when the curtain is moving in either direction—up or down.

The object of the invention is, further, to provide means whereby the width of the slot in the curtain may be varied from the outside of the shutter-casing and the width indicated to a nicety by means of a dial-plate.

The invention consists in improved mechanism whereby the width of the slot is regulated and recorded by a dial, again in the improved mechanism whereby it is impossible to change the width of the curtain-slot until one of the spindles is locked to the casing, and again in the improved mechanism for setting the curtain for time exposures, all as hereinafter fully described in the specification, and particularly set forth in the claims thereof.

Referring to the drawings, Figure 1 is a rear elevation of my improved photographic shutter, showing the parts in their relative positions when the curtain is wound upon the upper roll, the same being broken away to save space in the drawings and a portion of the casing shown in section at the right-hand side thereof. Fig. 2 is a side elevation of the same as viewed from the left of Fig. 1. Fig. 3 is a side elevation of the same as viewed from the right of Fig. 1. Fig. 4 is a section, partly in elevation, taken on line A A of Fig. 2 looking toward the left in said figure, the same being partly broken away to save space. Fig. 5 is a section, partly in elevation, taken on line B B of Fig. 4 looking toward the left in said figure. Fig. 6 is a section, partly in elevation, taken on line C C of Fig. 1 looking toward the right in said figure. Fig. 7 is a detail section, partly in elevation, taken on line A A of Fig. 2, with the clutch-slide drawn toward the left and the gear thrown in mesh with the dial-gear. Fig. 8 is a front elevation of the left-hand portion of my improved photographic shutter. Fig. 9 is a detail section illustrating the tape-winding reels, taken on line D D of Fig. 1 looking toward the left in said figure. Fig. 10 is a detail section, partly in elevation, taken on line E E of Fig. 1 looking toward the left in said figure and illustrating the manner in which the curtain is wound upon the curtain-rolls. Fig. 11 is a detail section, partly in elevation and broken away, taken on line F F, Fig. 2. Fig. 12 is a detail section, partly in elevation, taken on line G G of Fig. 2. Fig. 13 is a rear elevation, similar to Fig. 1, broken away to save space, illustrating the curtain in position to have the width of slot changed. Fig. 14 is a detail side elevation of the clutch-slide lock and the plate in which it slides. Fig. 15 is a detail section, partly in elevation, taken on line H H of Fig. 1 looking toward the left in said figure and illustrating the relative position of the upper intermittent gear and stop-gear. Fig. 16 is a detail section, taken on line I I of Fig. 1, illustrating the lower intermittent gear and intermittent stop-gear. Fig. 17 is a detail plan of the clutch-slide.

Like numerals refer to like parts throughout the several views of the drawings.

The general construction and operation of the photographic shutter hereinbefore specifically described is similar to the operation of the shutter shown and described in my Letters Patent hereinbefore referred to—that is, the curtain is a slotted curtain and is fast at opposite ends thereof, respectively, to two rotary rolls. The rolls are mounted upon a pair of rotary spindles, and each of said rolls is rotated by means of a torsional spring wound upon said spindle. There are means to lock each of said spindles to its respective roll and means to lock each of said spindles against rotation. The particular mechanism by which the lower roll is locked while the slot in the curtain is being adjusted to any desired width is different in the present device from that described in my Letters Patent referred to. The rotary dial is also a new feature in the present device. The manner of winding the springs in the upper and lower rolls and the means by which the lever connected to the upper and lower spindles for the purpose of imparting longitudinal motion to said spindles is operated is an entirely new departure in the present device. The mechanism by means of which the curtain is set for time exposure is also novel.

In the drawings, 20 is a rectangular casing or frame, being, preferably, formed of wood and having an auxiliary casing 20' formed of sheet metal attached thereto. The rolls and curtain are contained within the casing 20, while the mechanism for winding the rolls and for moving said rolls longitudinally thereof is contained within the auxiliary casing 20'.

21 is a curtain made in two parts—an upper part 22 and a lower part 23—said parts being separated from each other at their adjacent ends by a slot 24. The part 22 is fastened to a rotary roll 25, and the part 23 is fastened to a rotary roll 26.

The roll 25, Figs. 1, 4, and 10, consists of a tube 27, having an annular ring 28 fast to the left-hand end thereof and forming a head therefor, and at the right-hand end said tube has a disk 29 fastened thereto, said disk in turn being fastened to a sleeve 30, which extends through one side of the casing 20 and has an intermittent pinion-gear 31 formed upon its outer end. The intermittent pinion-gear 31 meshes into an intermittent stop-gear 32, journaled to rotate upon a screw 33, fast to the casing 20'. The intermittent stop-gear 32 is provided with a stop-tooth 34, which serves to stop the rotation of the roll when the parts have rotated until said stop-tooth comes in contact with a stop-slide or with the periphery of said intermittent pinion-gear, as hereinafter described. Within the interior of the tube 27, near the left-hand end thereof, is fastened a disk 35, said disk being journaled to rotate upon a spindle 36, said spindle in turn being journaled to rotate in the sleeve 30 at the right-hand end thereof, Fig. 4, and in a sleeve 37, extending through the left-hand side of the casing in said figure. A torsional spiral spring 38 encircles the spindle 36 and is fast at one end to a collar 39, fast to the spindle 36, the other end of said spring being fastened to the disk 35.

A clutch-disk 40, fast to the spindle 36, is provided with recesses 41, adapted to engage a spring-pin 42 upon the disk 35, and thereby lock the spindle 36 to the disk 35 and tube 27 when the spindle is drawn toward the right from the position in which it is shown in Fig. 4. The spindle 36 has fastened to the right-hand end thereof a sleeve 43, and formed upon the periphery of said sleeve is a pinion-gear 43''. A thumb-disk 43' is fast to the sleeve 43 outside the auxiliary casing 20'. The sleeve 43 has fastened thereto a ratchet 44, and a pawl-lever 45, pivoted at 46 to the casing 20', engages said ratchet 4. The spring 38 is wound up by turning the gear 43'' toward the right, Fig. 5, in a manner hereinafter described, the ratchet and pawl locking the spindle against unwinding the spring when in the position shown in Fig. 5.

The arm 47 of the pawl-lever 45 extends across one end of a pneumatic piston 48. Said pneumatic piston is arranged to be reciprocated lengthwise of a cylinder 49 by air forced through a pipe 50 by means of a rubber tube and air-bulb in a manner well known to those skilled in this art. When the piston 48 is forced upwardly by the pressure of air, the arm 47 of the pawl-lever 45 is raised, disconnecting the other arm of said pawl-lever from the teeth of the ratchet 44 and allowing the spring 38 to unwind, rotating the upper roll 25 and winding the curtain thereon, as shown in Fig. 4.

The lower roll 26, Figs. 4, 7, 10, 11, and 12, consists of a tube 51, and the right-hand end of said tube has a disk 52 fast thereto, said disk being in turn fastened to a sleeve 53, which extends through one side of the casing 20 and has an intermittent pinion-gear 54 formed upon its outer end. The intermittent pinion-gear 54 meshes into an intermittent stop-gear 55, journaled to rotate upon a screw 56, fast to the casing 20'. The intermittent stop-gear 55 is provided with a stop-tooth 57, which serves to stop the rotation of the roll 26 when the parts are in the position shown in Fig. 5 and also when said tooth comes in contact with a stop-slide, as hereinafter described. Within the interior of the tube 51, near the left-hand end thereof, is fastened a disk 58, said disk being journaled to rotate upon a spindle 59, said spindle in turn being journaled to rotate in the sleeve 53, at the right-hand end thereof, Fig. 4, and also in a cylindrical clutch-slide 60.

A torsional spiral spring 61 encircles the spindle 59 and is fast at one end to a collar 62, fast to the spindle 59, the other end of said spring being fastened to the disk 58. A clutch-disk 63, fast to the spindle 59, is provided with recesses 64, adapted to engage a spring-pin 65 upon the disk 58, and thereby lock the disk 58 to the spindle 59 and tube 51 when the spindle is drawn toward the right, as shown in Fig. 4. The spindle 59 has fastened thereto, at the right-hand end thereof, a sleeve 66, provided upon its periphery with a pinion-gear 66″, and outside the auxiliary casing 20′ a thumb-disk 66′ is provided fast to said sleeve 66. A ratchet 67 is fast to the sleeve 66, and engaging said ratchet is a pawl-lever 68, pivoted at 69 to the casing 20′. The spring 61 is wound up by rotating the pinion-gear 66″ toward the left, Fig. 5, the ratchet and pawl locking the spindle against unwinding the spring when in the position shown in said Fig. 5. The arm 70 of the pawl-lever 68 extends across one end of a pneumatic piston 71. Said pneumatic piston is arranged to be reciprocated lengthwise of the cylinder 49, fast to the casing 20′, by air forced through the pipe 50 by means of a rubber tube and bulb, as hereinbefore described. When the piston 71 is forced downwardly by the pressure of the air, Fig. 5, the arm 70 of the pawl-lever 68 is lowered, disconnecting the other arm of said pawl-lever 68 from the teeth of the ratchet 67 and allowing the spring 61 to unwind, rotating the lower roll 26 and winding the curtain thereon, as hereinafter more fully described.

The spindles 36 and 59 are each movable longitudinally thereof for the purpose of bringing the clutch-disks 40 and 63, respectively, into and out of connection with the spring-pins 42 and 65, and thus connecting the spindle 36 to the tube 27 or disconnecting the same therefrom and connecting the spindle 59 to the tube 51 or disconnecting said spindle from said tube. When the spindle 36 is locked to the tube 27, it is necessary in the operation of the shutter that the spindle 59 should be disconnected from the tube 51, and vice versa, and to insure this result a lever 72 is provided pivoted at 73 to the casing 20′. One end of said lever is forked to straddle the sleeve 43 and bears against one side of the pinion-gear 43″ and against one side of the ratchet 44. The other end of said lever is also forked and straddles the lever 66, bearing at the opposite sides thereof against the pinion-gear 66″ and the ratchet 67, respectively. It will therefore be seen that when the lever 72 is rocked upon its pivot 73, as hereinafter described, the spindle 36 will be moved toward the right, while the spindle 59 will be moved toward the left, and vice versa. Near the upper end of the lever 72 is provided a stop 74, and near the lower end of said lever another stop, 75, is provided, said stops alternately being thrown into and out of line with the pneumatic pistons 48 and 71 as the lever 72 is rocked upon its pivot.

When the lever 72 is in the position shown in Fig. 4, if the bulb is compressed the pneumatic piston 71 will move downwardly and disconnect the pawl-lever 68 from the ratchet 67, and the curtain will then be wound upon the upper roll, as shown in said figure, by the rotation of said roll 25 and the unwinding of the spring 38. When the lever 72 is rocked upon its pivot, as hereinafter described, the upper end of said lever moving toward the right and the lower end toward the left from the position shown in Fig. 4, the lever is in such a position that the stop 75 will be in line with the pneumatic piston 71 and the stop 74 will be out of line with the pneumatic piston 48, and therefore upon operation of the bulb said pneumatic piston 48 will move upwardly, disconnecting the pawl-lever 45 from the ratchet 44 and releasing the upper spindle 36, so that the curtain may be wound upon the lower roll 26 by the rotation of said roll and the unwinding of the spring 61.

The lever 72 is rocked upon its pivot by means of a slide 105, constructed to slide in ways 106, provided in the auxiliary casing 20′. The slide 105 has a spindle 107 rotatably mounted thereon and terminating at its left-hand end, Fig. 4, in a rounded head 108 and pin 109. The pin 109 projects into a slot 110, formed in and extending longitudinally of the lever 72. A winding-gear 11 is fastened to the spindle 107, and when the slide 105 is raised to the position shown in Figs. 4 and 5 said winding-gear is constructed to mesh into the pinion-gear 43″. The slide 105 is held upwardly in the position shown in Figs. 4 and 5 by a spring 112, and to the outer end of the spindle 107 is fastened a pivoted handle 113, by means of which said spindle is rotated outside the casing 20′, and through the gear 111 and pinion-gear 43″ the spindle 36 is rotated and the spring 38 is wound up. To wind up the spring 61, the upper end of the spring 112 is pushed inwardly by means of the knob 114, fast to the upper end thereof. The slide 105 is then moved downwardly until the upper side thereof passes beneath the lower end of the spring 112, which then snaps above said slide and holds it in position, the winding-gear 111 then being in mesh with the pinion-gear 66″. By rotating the handle 113 it is evident that the spindle 59 through said gearing will be rotated and the spring 61 will be wound up.

The slide 105 in addition to serving as a means for carrying the gear 111 into mesh with the pinion-gears 43″ and 66″ serves as a means to rock the lever 72 upon its pivot 73, the head 108 of the spindle 107 being so arranged and constructed that when the slide 105 is moved downwardly from the position shown in Fig. 4 it will engage the right-hand edge of the lever 72 at its lower end and push said lever toward the left in said figure, thus moving the spindle 59 toward the left from the position shown in Fig. 4 and unlocking the roll 26 from the spindle, as hereinbefore described, while the upper spindle 36 will be thrown toward the right by the upper end of the lever 72 and the upper spindle and roll locked together, as hereinbefore described. When the slide 105 is moved upwardly to the position shown in Figs. 3 and 5, then the head of the spindle engages the right-hand end of the lever 72, at the upper end thereof, and moves said lever into the position shown in Fig. 4, disconnecting the upper spindle from its respective roll and connecting the lower spindle to its respective roll. It will thus be seen that the slide 105 with the gear thereon serves as a means not only to rotate each of the spindles and wind up their respective springs, but also rocks the lever and brings the spindles into the proper position longitudinally with relation to their respective rolls, so that said spindles are locked to their respective rolls or unlocked therefrom, as the case may be, at the proper time for the winding of the springs.

The operation of the mechanism hereinbefore specifically described is substantially the same as the operation of the shutter illustrated and described in said Letters Patent, with the exception that the lever 72 is rocked upon its pivot by moving the slide 105 upwardly or downwardly, as hereinbefore described. Briefly, this operation is as follows: Assuming the springs 38 and 61 to be wound up and the curtain wound upon the upper roll, the slide 105 is moved downwardly by means of the handle 113 until the gear 111 meshes into the gear 66″. This movement of the slide pushes the lower spindle toward the left and the upper spindle toward the right, locks the upper spindle to the upper roll, and unlocks the lower spindle from the lower roll. The air-bulb being pressed forces the piston 48 upwardly, disengages the pawl 45 from the ratchet 44, and allows the curtain to be wound upon the lower roll by the unwinding of the spring 61. The springs when wound up are of sufficient capacity to allow the curtain to be moved upwardly and downwardly four times without perceptible diminution of tension. If desired, the springs may be kept constantly wound up to their full extent by rotating the handle 113 every time that it is moved upwardly or downwardly. It will thus be seen and understood that by means of my improved mechanism the curtain may be actuated in opposite directions, each time making an exposure by means of the slot therein. The manner of adjusting the width of the slot 24 to different distances and recording the width of said slot by means of a rotary dial is illustrated in Figs. 1, 2, 3, 4, 5, 6, 7, 9, 10, 11, and 12.

Assuming the curtain 21 to be wound upon the upper roll 25, as illustrated in Figs. 4 and 10, and the springs upon both of the spindles 36 and 59 wound up, the different parts being in the relative positions illustrated in Fig. 4, it will be seen that the clutch-disk 63 is in connection with the spring-pin 65 when the lower roll and spindle are locked together. Now upon rotating the lower thumb-disk 66′ toward the left, Fig. 3, the curtain 21 will be partly wound from the upper roll onto the lower roll into the position shown in Fig. 13, bringing the slot 24 away from the upper roll, as shown in full lines in said figure, and rotating the intermittent pinion-gear 54 toward the left in the direction of the arrow $a$, Fig. 3, until the tooth upon said intermittent pinion-gear describes practically a complete rotation and engaging the intermittent stop-gear 55 rotates said stop-gear in the direction of the arrow $b$, Fig. 3, until a hole 76 in said intermittent stop-gear comes in line with a locking-rod 77, whereupon said locking-rod will be forced into said hole by a spiral compression-spring 116, Figs. 11 and 12, and thus the lower roll 26 will be locked in position against rotation by means of said locking-rod, intermittent stop-gear 55, and intermittent pinion-gear 54, it being understood that said intermittent pinion-gear is fast to or integral with the sleeve 53, the sleeve 53 being fast to the disk 52 and the disk 52 being fastened by a screw to the tube 51, as shown in Fig. 4.

The locking-rod 77 is constructed to slide in the opposite sides of the casing 20 and has fast thereto a collar 117, one end of the spring 116 bearing against said collar, the other end of said spring bearing against a plate 118, fast to the camera-casing. The rod 77 is held against the action of the spring 116 and out of engagement with the intermittent gear 55 by means of a slide 134, having an incline 135 thereon, Figs. 2, 7, and 11. When said slide is in the position illustrated in Fig. 11, the rod 77 is prevented from moving toward the right by a collar 136, fast to said rod and bearing against the left-hand side of the slide 134. When the slide 134 is pushed downwardly, as shown in Fig. 7, the collar 136 rides down upon the incline 135, the spring 116 carrying said collar and the rod 77 toward the right, as hereinbefore described.

It will be understood that the lower roll 26 is now locked to the casing 20 and that the lower part 23 of the curtain 21 is fastened to said lower roll. To increase the width of the slot between the lower part 23 and the upper part 22 of the curtain 21, I provide means whereby the upper part 22 of the curtain is drawn away from said lower part 23, and also in order to decrease the width of the slot said means operates to draw the part 22 toward the lower part 23. Said means for varying the width of the slot 24 consists of the cylindrical clutch-slide 60, hereinbefore referred to. (Illustrated in detail in Fig. 17, in elevation in Fig. 12, and in section in Figs. 4 and 7.) Said clutch-slide consists of a cylindrical sleeve portion 78, arranged to slide in a plate 79, fast to the camera-casing 20 and extending therethrough. Outside the casing said cylindrical clutch-slide is provided with a thumb-disk 80 and inside said casing with projections 81, Fig. 17, arranged to engage spaces or depressions 82, formed in the clutch-disk 83, as seen in Fig. 4. The clutch-disk 83 is fastened by screws to the tube 51, and the clutch-slide 60 projects through a spur-gear 80, Figs. 4 and 7, said spur-gear in turn projecting through and being fastened to a tape-reel 85 at the left-hand end of the lower roll, Fig. 4. A screw 119 has screw-threaded engagement with the tape-reel 85 and with the spur-gear 84, the inner end of said screw projecting into a slot 120, formed in the clutch-slide 60 and constituting a spline, by which the spur-gear 84 and the tape-reel 85 are rotated upon rotation of the thumb-disk 80 and clutch-slide 60, as seen in Figs. 4, 12, and 7.

The spur-gear 84 meshes into a pinion-gear 86, formed upon the left-hand end of the pinion-gear shaft 87, said pinion-gear shaft being arranged to rotate in bearings formed in the clutch-disk 83, the disk 58, and the disk 52, and having another pinion-gear 88 formed upon the right-hand end thereof, Fig. 4. The pinion-gear 88 meshes into a spur-gear 89, said spur-gear 89 being arranged to rotate upon the sleeve 53 at the right of Fig. 4 and having fastened thereto another tape-reel 90. The clutch-slide 60 is provided with an annular groove 121 in its periphery, into which a locking-slide 122 projects. Said locking-slide is constructed to slide in ways 123, formed in the plate 79, and is held upwardly and into the groove 121 by a spring 124, the object of this lock being to prevent the clutch-slide from being moved longitudinally thereof at all times except when the locking-rod 77 projects into the hole 76 in the intermittent stop-gear 55. The locking-rod 77 has a collar 125 fast thereto, said collar being provided with beveled ends, and when the locking-rod 77 is out of engagement with said intermittent stop-gear the lower end of the locking-slide 122 bears upon the periphery of said collar 125. When, however, the hole 76 in the intermittent gear comes in alinement with the rod 77, as hereinbefore described, the spring 116, carrying said rod, the rod carries the collar 125 to the right of the slide 122, Fig. 12, and the spring 124 carries said slide downwardly and out of engagement with the clutch-slide 60. Said clutch-slide may now be drawn toward the left from the position shown in Fig. 12 until the projections 81 are withdrawn from the recesses 82 and a gear 126, fast to said clutch-slide, is brought into mesh with a gear 127, formed upon the periphery of a rotary dial 128, journaled to rotate upon a pin 129.

The rotary dial 128 is inclosed within a cover 130, which has a pin 131 projecting inwardly therefrom and across the path of rotation of a stop-pin 132, fast to said dial. Assuming now that the clutch-slide is drawn toward the left, as hereinbefore described, from the position shown in Fig. 12 to that shown in Fig. 7, upon rotation of the thumb-disk 80 the tape-reel 85 will be rotated, and through the spur-gear 84, the pinion-gears 86 and 88, and spur-gear 89 the tape-reel 90 will also be rotated. Said tape-reels 85 and 90 are each provided with a tape 91 and 92, respectively, one end of each of said pieces of tape being fastened to its respective tape-reel, the other end being fastened to one side of the lower part 23 of the curtain 21, and intermediate of the two ends of each of said pieces of tape said pieces of tape pass through eyes 93 and 94, formed in a flat strip of metal 95, fast to the lower end of the upper part 22 of the curtain 21. As seen in Figs. 13 and 9, the tapes 91 and 92 pass from the lower roll upwardly through the eyes 93 and 94, respectively, and then passing downwardly are fastened to eyes 96 and 97, formed in a metal strip 98, fast to the free end of the lower portion 23 of the curtain 21. As the thumb-disk 80 is turned in the direction of the arrow $c$, Figs. 2 and 6, the tape-reels 85 and 90 will be turned in the direction of the arrow $d$, Fig. 9, and the tapes 91 and 92 will be paid off from said tape-reels, allowing the upper curtain-roll to rotate and draw the upper portion of the curtain upwardly, increasing the width of the slot. By turning the thumb-disk 80 in the opposite direction the width of the slot will be narrowed, the tapes 91 and 92 being wound up on the tape-reels.

Upon the face of the dial 128 are twenty-four divisions from "1" to "24," inclusive, these divisions indicating the width of the slot in the curtain as they appear through an opening 133 in the dial-cover 130. The largest numbers indicate the smallest width of slot, and vice versa. It will be seen that as the rotary dial is rotated it will be impossible to rotate the same beyond one revolution, as the pin 132 comes in contact with the pin 131 and limits the rotation of said dial-plate to one rotation, and this prevents the tape from being entirely unwound from the tape-reel 90 and then by continued rotation of said tape-reel in the same direction winding the same in the wrong direction upon said tape-reel.

It will be seen and understood that by means of the locking-rod 77 and locking-slide 122, together with the intermittent stop-gear 55 and the hole 76, provided therein, the gear 126 is always brought into mesh with the gear 127 in such a manner that the rotary dial and the slot in the curtain maintain the same relative location. In taking time exposures it is desirable that the slot should be set in the curtain of a width substantially equal to the length of the surface to be exposed and that said slot should be instantaneously moved into position in front of the plate and also after the picture has been taken shall be instantaneously moved across the plate. To obtain this result, I provide two slides 137 and 138, Figs. 5 and 8. These slides are arranged to slide in ways provided in the auxiliary casing 20'. The slide 137 is actuated by a lever 139, to which it is connected by a pin 139'. Said lever 139 is pivoted at 140 to said auxiliary casing and rocked upon said pivot in one direction by a spiral spring 141, fast to the upper end thereof, and in the opposite direction by a cam-plate 142, pivoted to a screw 143, fast to the auxiliary casing 20', said cam-plate bearing against a flange 144, projecting upwardly from the lever 139, said cam-plate being provided for convenience in manipulation with a flange 145, projecting upwardly therefrom.

It will be seen that by rocking the cam-plate 142 on its pivot in the direction of the arrow $e$, Fig. 8, the lever 139 will be moved toward the left at its lower end and toward the right at its upper end, thus carrying the slide 137 toward the right, Fig. 8, and across the path of rotation of the stop-tooth 34 on the intermittent stop-gear 32. Another lever 146 is connected to the slide 138 by a pin 147 and is rocked upon its pivot 140 by a cam-plate 148, pivoted to a screw 149, fast to the casing 20' and operating substantially as hereinbefore described in relation to the lever 139 to move the lower slide 138 toward the right, Fig. 8, and across the path of rotation of the stop-tooth 57 upon the intermittent stop-gear 55. It will be understood that the slides 137 and 138 are used to stop the curtain when the slot in the curtain is at its greatest width for time exposures and to stop said slot in line with the plate or film upon which the picture is to be taken.

The operation of setting the curtain for time exposures is as follows: Assuming the parts to be in the position indicated in Figs. 7 and 13, the thumb-disk 80 is rotated, as hereinbefore described, until the division "1" upon the dial comes beneath the opening 133. The top of the slot in the curtain will then be at the point indicated by broken and dotted lines, Fig. 13, the bottom of said slot being the top of the lower portion of said curtain and shown in full lines. The lock-slide is pushed toward the right, Fig. 12. The slide 134 is now pushed upwardly into the position indicated in Fig. 11, thus withdrawing the rod 77 from the stop-gear 55. The bulb is pressed, and the curtain is wound upon the upper roll with the slot for time exposure encircling said roll, and the camera is now in readiness to have the curtain with its time-exposure slot set to have the picture taken by time exposure. The cam-plate 142 is now moved, as hereinbefore described, rocking the lever 139 and moving the slide 137 across the path of rotation of the tooth 34 upon the intermittent stop-gear 32. The slide 105 is now moved to its lowermost position, reversing the respective positions of the upper and lower spindles, and the bulb pressed again, whereupon the curtain will start to move downwardly, unwinding from the upper roll and winding upon the lower roll until the intermittent stop-gear 32 is rotated by the intermittent pinion-gear 31 and the stop-tooth 34 comes in contact with the stop-slide 137. This locates the slot in the curtain in correct position in front of the film or plate for a picture to be taken. Finally after the plate has been sufficiently exposed the slide 137 is removed from the path of rotation of the stop-tooth 34 and the bulb pressed again, whereupon the curtain is wound upon the lower roll, together with the full extent of the slot in said curtain.

Having thus described my invention, what I claim, and desire by Letters Patent to secure, is—

1. In a photographic shutter, a slotted curtain, a pair of rotary rolls attached thereto, a pair of rotary spindles upon which said rolls are mounted, means to rotate said rolls, means to lock each of said spindles to its respective roll, means to lock each of said spindles against rotation, a gear fast to each of said spindles, a slide constructed to slide in ways upon the casing of said camera, and a winding-gear rotatably mounted upon said slide and constructed to be moved into and out of engagement alternately with said gears.

2. In a photographic shutter, a slotted curtain, a pair of rotary rolls attached thereto, a pair of rotary spindles upon which said rolls are mounted, said spindles movable longitudinally thereof, a clutch upon each of said spindles, said clutches operating to lock said spindles to said rolls by moving said spindles longitudinally thereof in one direction and to unlock said spindles from said rolls by moving said spindles longitudinally thereof in the opposite direction, a lever connected to said spindles, and a slide constructed to slide in ways upon the casing of said camera, and operating to rock said lever and simultaneously move said spindles in opposite directions.

3. In a photographic shutter, a slotted curtain, a pair of rotary rolls attached thereto, a pair of rotary spindles upon which said rolls are mounted, said spindles movable longitudinally thereof, a clutch upon each of said spindles, said clutches operating to lock said spindles to said rolls by moving said spindles longitudinally thereof in one direction and to unlock said spindles from said rolls by moving said spindles longitudinally thereof in the opposite direction, a lever connected to said spindles, a gear fast to each of said spindles, a slide constructed to slide in ways upon the casing of said camera and operating to rock said lever and simultaneously move said spindles in opposite directions, and a winding-gear rotatably mounted upon said slide and constructed to be moved into and out of engagement alternately with said gears.

4. In a photographic shutter, a slotted curtain, a pair of rotary rolls attached thereto, a pair of rotary spindles upon which said rolls are mounted, said spindles movable longitudinally thereof, a clutch upon each of said spindles, said clutches operating to lock said spindles to said rolls by moving said spindles longitudinally thereof in one direction and to unlock said spindles from said rolls by moving said spindles longitudinally thereof in the opposite direction, a lever connected to said spindles and operating to simultaneously move them in opposite directions, a ratchet fast to each of said spindles, a pair of stop-pawls, each engaging its respective ratchet, mean to alternately disengage said pawls from said ratchets, a gear fast to each of said spindles, a slide constructed to slide in ways upon the casing of said camera and operating to rock said lever and simultaneously move said spindles in opposite directions, and a winding-gear rotatably mounted upon said slide and constructed to be moved into and out of engagement alternately with said gears.

5. In a photographic shutter, a slotted curtain, a pair of rotary rolls attached thereto, a pair of rotary spindles upon which said rolls are mounted, said spindles movable longitudinally thereof, a clutch upon each of said spindles, said clutches operating to lock said spindles to said rolls by moving said spindles longitudinally thereof in one direction and to unlock said spindles from said rolls by moving said spindles longitudinally thereof in the opposite direction, a lever connected to said spindles and operating to simultaneously move them in opposite directions, a ratchet fast to each of said spindles, a pair of stop-pawls each engaging its respective ratchet, a pair of pneumatic pistons, means to alternately reciprocate said pneumatic pistons and alternately disengage said pawls from said ratchets, a gear fast to each of said spindles, a slide constructed to slide in ways upon the casing of said camera and operating to rock said lever and simultaneously move said spindles in opposite directions, and a winding-gear rotatably mounted upon said slide and constructed to be moved into and out of engagement alternately with said gears.

6. In a photographic shutter, a slotted curtain, a pair of rotary rolls attached thereto, a pair of rotary spindles upon which said rolls are mounted, said spindles movable longitudinally thereof, a clutch upon each of said spindles, said clutches operating to lock said spindles to said rolls by moving said spindles longitudinally thereof in one direction and to unlock said spindles from said rolls by moving said spindles longitudinally thereof in the opposite direction, a lever connected to said spindles and operating to simultaneously move them in opposite directions, a ratchet fast to each of said spindles, a pair of stop-pawls each engaging its respective ratchet, a pair of pneumatic pistons, means to reciprocate said pistons and disengage said pawls from said ratchets, a pair of stops upon said lever arranged to alternately cross the line of motion of said pistons for the purpose specified, a gear fast to each of said spindles, a slide constructed to slide in ways upon the casing of said camera and operating to rock said lever and simultaneously move said spindles in opposite directions, and a winding-gear rotatably mounted upon said slide and constructed to be moved into and out of engagement alternately with said gears.

7. In a photographic shutter, a pair of rotary rolls, a curtain in two parts provided with a slot between said parts, each of said parts fast to its respective roll, means to lock one of said rolls against rotation, means to rotate the other of said rolls from the outside of said casing and vary the width of said slot, a rotary dial, and means to operatively connect said dial to one of the parts of said curtain.

8. In a photographic shutter, a pair of rotary rolls, a curtain in two parts provided with a slot between said parts, each of said parts fast to its respective roll, means to lock one of said rolls against rotation, means to rotate the other of said rolls from the outside of said casing and vary the width of said slot, a rotary dial, and means to operatively connect said dial to one of the parts of said curtain and to disconnect said dial therefrom.

9. In a photographic shutter, a casing, a pair of rotary rolls, a pair of rotary spindles upon which said rolls are mounted, means to rotate said rolls, means to lock each of said spindles to its respective roll and means to lock each of said spindles against rotation; in combination with a curtain in two parts, provided with a slot between said parts, each of said parts fast to its respective roll, a tape-reel journaled upon one of said spindles at the end of one of said rolls, means to lock said tape-reel to said roll and unlock said tape-reel from said roll, a rotary dial, and means to rotatably connect and disconnect said roll and dial.

10. In a photographic shutter, a casing, a pair of rotary rolls, a pair of rotary spindles upon which said rolls are mounted, means to rotate said rolls, means to lock each of said spindles to its respective roll, and means to lock each of said spindles against rotation; in combination with a curtain in two parts, provided with a slot between said parts, each of said parts fast to its respective roll, a tape-reel journaled upon one of said spindles at one end of one of said rolls, a clutch movable longitudinally of said spindle to lock said tape-reel to said roll, said clutch extending through said casing, a rotary dial-gear, a gear fast to said clutch and constructed to mesh into said dial-gear when said tape-reel is unlocked from said roll.

11. In a photographic shutter, a casing, a rotary curtain-roll, a slotted curtain, one end of said curtain fast to said roll, means to lock said roll against rotation, a spindle upon which said roll is journaled, a tape-reel journaled upon said spindle at one end of said roll, a disk fast to said roll and provided with depressions, a clutch movable longitudinally of said spindle to engage said depressions and lock said tape-reel to said roll and to unlock said tape-reel from said roll when withdrawn from said depressions, said clutch extending through said casing, a rotary dial-gear, and a gear fast to said clutch and constructed to mesh into said dial-gear when said tape-reel is unlocked from said roll.

12. In a photographic shutter, a casing, a rotary curtain-roll, a slotted curtain, one end of said curtain fast to said roll, means to lock said roll against rotation, a spindle upon which said roll is journaled, a pair of tape-reels journaled upon said spindle, one at each end of said roll, a gear fast to each of said tape-reels, a pinion-shaft journaled within said roll, a pinion at each end of said pinion-shaft intermeshing said gears, and a clutch movable lengthwise of said shaft splined to one of said tape-reels and extending through said casing, a rotary dial-gear, a gear fast to said clutch and constructed to mesh into said dial-gear when said tape-reel is unlocked from said roll.

13. In a photographic camera, a casing, a slotted curtain, a roll attached thereto, a spindle upon which said roll is mounted, a gear fast to said spindle, a stop-gear journaled to rotate upon said casing and meshing into said gear, and a locking-rod constructed to engage said stop-gear and lock the same against rotation, and a spring acting to move said rod into engagement with said stop-gear.

14. In a photographic camera, a casing, a slotted curtain, a roll attached thereto, a spindle upon which said roll is mounted, a gear fast to said spindle, a stop-gear journaled to rotate upon said casing and meshing into said gear, a locking-rod constructed to engage said stop-gear and lock the same against rotation, and means to hold said rod out of engagement with said stop-gear.

15. In a photographic camera, a casing, a slotted curtain, a roll attached thereto, a spindle upon which said roll is mounted, a tape-reel journaled upon said spindle at one end of said roll, a clutch movable longitudinally of said spindle and constructed to lock said tape-reel to said roll and to unlock said tape-reel therefrom, and means to lock said clutch against longitudinal movement.

16. In a photographic camera, a casing, a slotted curtain, a roll attached thereto, a spindle upon which said roll is mounted, a tape-reel journaled upon said spindle at one end of said roll, a clutch movable longitudinally of said spindle and constructed to lock said tape-reel to said roll and to unlock said tape-reel therefrom, means to lock said clutch against longitudinal movement, a rotary dial-gear, and a gear fast to said clutch and constructed to be moved into and out of engagement with said dial-gear.

17. In a photographic camera, a casing, a slotted curtain, a roll attached thereto, a spindle upon which said roll is mounted, a gear fast to said spindle, a stop-gear journaled to rotate upon said casing and meshing into said gear, a locking-rod constructed to engage said stop-gear and lock the same against rotation, a tape-reel journaled upon said spindle, at one end of said roll, a clutch movable longitudinally of said spindle and constructed to lock said tape-reel to said roll and to unlock said tape-reel therefrom.

18. In a photographic camera, a casing, a slotted curtain, a roll attached thereto, a spindle upon which said roll is mounted, a gear fast to said spindle, a stop-gear journaled to rotate upon said casing and meshing into said gear, a locking-rod constructed to engage said stop-gear and lock the same against rotation, a tape-reel journaled upon said spindle, at one end of said roll, a clutch movable longitudinally of said spindle and constructed to lock said tape-reel to said roll and to unlock said tape-reel therefrom, and means to lock said clutch against longitudinal movement.

19. In a photographic camera, a casing, a slotted curtain, a roll attached thereto, a spindle upon which said roll is mounted, a gear fast to said spindle, a stop-gear journaled to rotate upon said casing and meshing into said gear, a locking-rod constructed to engage said stop-gear and lock the same against rotation, a tape-reel journaled upon said spindle, at one end of said roll, a clutch movable longitudinally of said spindle and constructed to lock said tape-reel to said roll and to unlock said tape-reel therefrom, and means controlled by said locking-rod to lock said clutch against longitudinal movement.

20. In a photographic camera, a casing, a slotted curtain, a roll attached thereto, a spindle upon which said roll is mounted, a tape-reel journaled upon said spindle at one end of said roll, a rotary dial journaled upon said casing and rotatably connected to said reel, and a stop constructed to limit the rotation of said dial.

21. In a photographic camera, a casing, a slotted curtain, a roll attached thereto, a spindle upon which said roll is mounted, a gear fast to said spindle, a stop-gear journaled to rotate upon said casing and meshing into said gear, a locking-slide constructed to engage said stop-gear and lock the same against rotation and mechanism to throw said slide into and out of engagement with said stop-gear.

22. In a photographic camera, a casing, a slotted curtain, a roll attached thereto, a spindle upon which said roll is mounted, a gear fast to said spindle, a stop-gear journaled to rotate upon said casing and meshing into said gear, a locking-slide constructed to engage said stop-gear and lock the same against rotation and a lever engaging said slide and adapted to move the same into and out of engagement with said stop-gear.

23. In a photographic shutter, a casing, a slotted curtain, a pair of rotary rolls attached thereto, a pair of rotary spindles upon which said rolls are mounted, means to rotate said rolls, means to alternately lock each of said spindles to its respective roll and to alternately unlock said spindles from said rolls and allow said rolls to rotate, a pair of gears each fast to its respective spindle, a pair of stop-gears each journaled to rotate upon said casing and each meshing into its respective gear, a pair of locking-slides, each constructed to engage its respective stop-gear and lock the same against rotation, and mechanism to throw said slides into and out of engagement with their respective stop-gears.

In testimony whereof I have hereunto set my hand in presence of two subscribing witnesses.

JOHN S. WRIGHT.

Witnesses:
CHARLES S. GOODING,
ANNIE J. DAILEY.